United States Patent
Reinhart et al.

(10) Patent No.: US 6,664,298 B1
(45) Date of Patent: Dec. 16, 2003

(54) ZERO-VALENT METAL EMULSION FOR REDUCTIVE DEHALOGENATION OF DNAPLS

(75) Inventors: Debra R. Reinhart, Maitland, FL (US); Christian Clausen, Chuluota, FL (US); Cherie L. Geiger, Geneva, FL (US); Jacqueline Quinn, Titusville, FL (US); Kathleen Brooks, Orlando, FL (US)

(73) Assignee: The United States of America as represented by the Administrator of the National Aeronautics & Space Administration, Washington, DC (US)

(*) Notice: Subject to any disclaimer, the term of this patent is extended or adjusted under 35 U.S.C. 154(b) by 0 days.

(21) Appl. No.: 09/972,296

(22) Filed: Oct. 2, 2001

(51) Int. Cl.$^7$ .............................. B01F 17/00; B01F 3/08
(52) U.S. Cl. ...................... 516/22; 588/248; 252/181; 252/178
(58) Field of Search ............... 405/128.75, 128.45; 588/248; 252/181, 62.55; 516/22

(56) References Cited

U.S. PATENT DOCUMENTS

| | | | |
|---|---|---|---|
| 3,986,953 A | | 10/1976 | Beaucaire |
| 4,425,261 A | * | 1/1984 | Stenius et al. ............... 502/339 |
| 4,565,635 A | * | 1/1986 | Le Du et al. ................ 210/727 |
| 4,983,217 A | * | 1/1991 | Lopez Quintela et al. .... 75/739 |
| 5,266,213 A | | 11/1993 | Gillham |
| 5,278,106 A | * | 1/1994 | Nakashima et al. .......... 501/12 |
| 5,587,157 A | * | 12/1996 | Cox et al. ................... 424/76.5 |
| 5,615,974 A | | 4/1997 | Land |
| 5,641,425 A | | 6/1997 | McKedy |
| 5,733,067 A | * | 3/1998 | Hunt et al. ................... 175/19 |
| 5,746,937 A | | 5/1998 | McKedy |
| 5,789,649 A | | 8/1998 | Batchelor |
| 5,833,388 A | * | 11/1998 | Edwards et al. .............. 405/52 |
| 5,857,810 A | * | 1/1999 | Cantrell et al. ............. 405/263 |
| 5,868,939 A | * | 2/1999 | Oder et al. .................. 210/695 |
| 5,975,798 A | | 11/1999 | Liskowitz |
| 5,990,365 A | * | 11/1999 | Chang et al. ................ 585/475 |
| 6,013,232 A | * | 1/2000 | Quinn et al. ................. 166/245 |
| 6,039,882 A | | 3/2000 | Wolfe |
| 6,102,621 A | * | 8/2000 | Siegrist et al. ........... 405/128.5 |
| 6,121,371 A | * | 9/2000 | Matyjaszewski et al. ... 524/804 |
| 6,190,092 B1 | | 2/2001 | Miller |
| 6,207,114 B1 | | 3/2001 | Quinn |
| 6,217,779 B1 | | 4/2001 | Orth |
| 6,261,029 B1 | * | 7/2001 | Miller ......................... 405/263 |
| 6,264,399 B1 | | 7/2001 | Grisso |
| 6,265,205 B1 | * | 7/2001 | Hitchens et al. ............ 166/246 |
| 6,280,533 B1 | | 8/2001 | Hoppe |
| 6,357,968 B1 | * | 3/2002 | Dwyer et al. ............... 405/269 |
| 6,398,960 B1 | * | 6/2002 | Borden et al. .............. 210/610 |
| 6,423,531 B1 | * | 7/2002 | Hince et al. ................ 435/262 |
| 2002/0151602 A1 | * | 10/2002 | Vance et al. .................. 516/77 |

FOREIGN PATENT DOCUMENTS

SE  WO 97/09114  * 3/1997 ............ B01J/23/38

OTHER PUBLICATIONS

Geiger et al., "The In Situ Treatment of DNAPL with Zero–Valent Iron Emulsions", The 2001 International Containment & Remediation Technology Conference, presented Jun. 12, 2001, 3 pages.*

"The In Situ Treatment of DNAPL with Zero–Valent Iron Emulsions", Geiger et al, 27 pages, undated, found with Google.com search Feb. 27, 2003.*

Environmetal Technologies, Inc "Permeable Reactive Barrier Update", 4 pages, May 2000, from www.eti.ca.*

Center for Groundwater Research "Zero Valent Iron", 4 pages, from http://cgr.ese.ogi.edu/iron/iron, date unknown.*

AFCEE, Lee and Borden Technology Application of Low Cost Emplacement of Insoluble Organic Substrate for Enhanced In Situ Reductive Dechlorination of Halogenated Aliphatic Hydrocarbons: Dover Air Force Base, Delaware, Oct. 28, 1999, 6 pages.*

* cited by examiner

Primary Examiner—J. J. Swann
Assistant Examiner—Katherine Mitchell
(74) Attorney, Agent, or Firm—Randall M. Heald; Gary G. Borda; John G. Mannix

(57) ABSTRACT

A zero-valent metal emulsion is used to dehalogenate solvents, such as pooled dense non-aqueous phase liquids (DNAPLs), including trichloroethylene (TCE). The zero-valent metal emulsion contains zero-valent metal particles, a surfactant, oil and water. The preferred zero-valent metal particles are nanoscale and microscale zero-valent iron particles

5 Claims, No Drawings

ZERO-VALENT METAL EMULSION FOR REDUCTIVE DEHALOGENATION OF DNAPLS

ORIGIN OF INVENTION

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

1. Field of the Invention

This invention relates generally to the use of a zero-valent metal emulsion to remediate halogenated solvents found in water. Preferably, zero-valent iron emulsions containing nanoscale or microscale iron particles are used to remediate dense non-aqueous phase liquid (DNAPL) sources found in groundwater.

2. Description of the Background Art

Remediation of halogenated solvents, such as trichloroethylene (TCE), halogenated hydrocarbons, and other chlorinated solvents, is of great concern due to their toxicity and their persistence in the environment. Halogenated solvents, such as TCE, enter the groundwater and soil environments through improper disposal practices. These halogenated solvents are used in industry as degreasers; in the production of dry cleaning fluids, spot removers, insecticides and pesticides, as well as in many other manufacturing processes. Because of halogenated solvents' wide variety of uses they have become ubiquitous in the environment. According to the U.S. Environmental Protection Agency (USEPA), TCE has been found in at least 852 of the 1430 National Priorities List sites (ATSDR 1995).

When released into the ground, halogented solvents, such as TCE, will sink through the subsurface soil and groundwater until it is contained by a non-permeable surface such as bedrock. At this point it will pool and slowly dissolve into any water that it comes into contact with. Halogenated solvents, such as TCE, that have higher densities than water are referred to as dense nonaqueous phase liquids (DNAPLs). Due to the low solubility of many halogenated solvents, for example, TCE's low solubility ($1.1 \times 10^3$ mg/L), the pool will continue to contaminate groundwater for extended periods of time. As the groundwater is in constant motion, this pool can contaminate very large areas of potential drinking water. Breakdown of the halogenated solvents in natural environments is very slow and produces other potential harmful by-products that are also regulated by the USEPA in Title 40 Code of Federal Regulations. Currently, the maximum contaminant level of TCE acceptable in ground water established by the EPA is 4–5 $\mu$g/L.

Traditionally, the method of choice for remediation of TCE has been accomplished by pumping the contaminated water to a surface plant and removing the TCE by air stripping or granular activated carbon adsorption. The decontaminated water is then disposed of into wastewater treatment plants or re-injected into the ground.

Pump-and-treat technology has many limitations. Installing the surface plant is very costly. Additionally, although the initial depletion of TCE is quite high, the depletion levels off to values that are sometimes above the regulatory levels. The surface plant requires constant monitoring; it produces hazardous wastes, and requires an energy source to operate the pumps and strippers. Due to TCE's low solubility in water, remediation of the groundwater using pump-and-treat technologies will take very long periods of time (e.g. decades) in order to maintain protection of human health and the environment. The pump and treat technologies primarily provide containment, rather than remediation. Because of the length of time necessary in the pump and treat technologies, high operation and maintenance cost over the time period of remediation are incurred.

Several pilot and full-scale projects for remediation of DNAPLs employ the use of a permeable reactive barrier wall (PRBW) placed within groundwater. The PRBW is installed across a path of a contaminated plume. The contaminants are removed or degraded producing decontaminated water on the down gradient side of the wall. The use of zero-valent metals, such as iron, to reductively dechlorinate DNAPLs has been employed as the reactive material in these PRBWs. The use of PRBWs has several advantages over the traditional pump-and-treat methods of remediation. This process produces little waste and is much less labor intensive. Since it is a passive system, mechanical failures are eliminated. The most prominent drawback of the use of an in-situ permeable reactive wall is that, like pump-and-treat systems, it never actually treats the contaminant pool. These processes rely on the DNAPL dissolution and transport for treatment. Again, the process of complete remediation will take an extended period of time.

Currently, there are no available proven technologies that can treat 100% of DNAPL sources. These sources include free-phase, residual phase, and sorbed (or matrix diffused) phases of DNAPL. Attempts have been made to remove the DNAPL sources through heating to enhance volatilization. Such heating techniques have included steam injection and radio-frequency-heating. However, this approach is limited because of the energy costs associated with heating the groundwater and the exponential volume of areas that will need to be treated to ensure that the entire DNAPL source is encountered and treated.

An alternative approach has been to flood the source area with surfactants or oxidizing agents. DNAPL contaminates are remediated by injecting a surfactant to either solubilize or mobilize the DNAPL pool. The presence of surfactant micelles increases the solubility of the DNAPL in the groundwater. This method of remediation is unique in that it actually confronts the pools of DNAPL. However, DNAPLs such as TCE are more subject to uncontrolled migration using this technique and could produce larger contamination zones. Additionally, these surfactants only travel through most permeable zones. DNAPL pools diffuse into geological areas of low permeability preventing their 100% removal that is required to prevent the remaining DNAPL from re-contaminating the groundwater.

Therefore, a critical need exists for technologies that can effectively treat DNAPL sources in the saturated zone and result in both their destruction and containment with reduced treatment times and lower costs.

SUMMARY OF THE INVENTION

To overcome the foregoing problems, the present invention comprises a zero-valent metal emulsion containing zero-valent metal particles, surfactant, oil and water, and a method of using the same, to enhance dehalogenation of dense non-aqueous phase liquid (DNAPL) sources. The zero-valent metal emulsion is particularly suited for dehalogenation of solvents including, but not limited to, trichloroethene (TCE) and other halogenated hydrocarbons.

In a preferred embodiment, microscale and nanoscale iron particles are used as the zero-valent metal particles. Microscale and nanoscale iron particles are excellent reactive media to incorporate into a preferred zero-valent iron emulsion due to their reactivity, low cost, and natural presence in the subsurface. However, other zero-valent metal particles and combinations may be used to dehalogenate a DNAPL source. For example, iron particles doped with palladium are useful zero-valent metal particles to dehalogenate DNAPLs. Also, a variety of bimetallic particle combinations are useful in dehalogenating DNAPL sources.

Food grade vegetable oils and various cationic, anionic and nonionic surfactants are preferred components in the generation of the zero-valent metal emulsion. Preferably, food-grade surfactants are used because of their low toxicity.

In the preferred zero-valent iron emulsion, a very active zero-valent iron emulsion contains 32–53 wt. % oil, 36–59 wt % water, 6.4–10.6 wt. % iron particles, 1.0–1.8 wt. % surfactant More preferably, the zero-valent iron emulsion contains 42.7 wt. % oil, 47.4 wt. % water, 8.5 wt % iron particles, 1.4 wt. % surfactant. However, other ranges of oil, water, iron particles, and surfactant may also be effective to dehalogenate DNAPLs.

The zero-valent metal emulsion that is generated is hydrophobic, which allows the DNAPL source, for example TCE, to enter through an oil membrane where it can diffuse to the zero-valent metal particle and undergo degradation. In contrast, an aqueous slurry of reactive iron particles would be rejected by the hydrophobic DNAPL pool.

The zero-valent metal emulsion efficiently degrades DNAPLs, such as TCE, and challenges the DNAPL pool. The preferred zero-valent iron emulsion containing zero-valent nanoscale or microscale iron particles reductively dehalogenates DNAPLs to non-toxic hydrocarbons, such as ethene. The effectiveness of the degradation may be determined by comparing the rate constants of degradation of DNAPLs, such as TCE, of pure zero-valent metal particles to the rate constants of the zero-valent metal emulsion.

The zero-valent metal emulsion may be delivered to the DNAPL phase in a variety of ways. Ideally, the DNAPL phase would be located and defined. In one embodiment, the zero-valent metal emulsion is delivered in-situ to contamination pools via a system of injection wells. The injection wells are permanent structures that are left in the ground for repeatedly injecting the zero-valent metal emulsion into the ground. Alternatively, the zero-valent metal emulsion may be delivered to the DNAPL using direct push technology. This technology includes push rods that are advanceD specified distances into the injection site. The zero-valent emulsion is delivered to the DNAPL through holes in a distal portion of the push rods. When the injection of the zero-valent metal emulsion is complete, the push rods are removed from the ground. It is also possible to deliver the zero-valent metal emulsion by way of slurry injection into a soil matrix.

The present invention overcomes the previous understanding that the incorporation of zero-valent metal particles, such as iron particles, into a liquid membrane micelle would lead to passivation of the particle surface with regard to its ability to dehalogenate compounds. Kinetic studies have shown that the dehalogenation rates of a zero-valent metal emulsions are very high, and in fact, are much higher than free zero-valent metal particles with regard to the dehalogenation pools of pure DNAPL.

A beneficial feature of the zero-valent metal emulsion is that no halogen-containing atoms exit from the micelle during remediation. The zero-valent metal emulsion draws free DNAPL into the inside of the micelle where the degradation reaction takes place. For example, during the remediation of TCE, no chlorinated daughter-products have been found to exit from the micelle. The only degradation by-products that have been detected are hydrocarbons, such as ethene, which are easily degraded by biological action and are non-toxic.

Additionally, the zero-valent metal emulsion is simple to prepare and is relatively inexpensive. The zero-valent emulsion is made from environmentally compatible components. The preferred surfactant is of the food-grade quality, and the liquid membrane preferably consists of a vegetable oil which is biodegradable. Since the zero-valent metal emulsion can be injected into the DNAPL zone by using simple push wells and incur no continuing operating costs, use of an zero-valent emulsion possesses an economic advantage over a long-term pump and treat methodology. Because of the thousands of DNAPL sites in the United States alone, use of this technique would generate millions of dollars in economic improvement within the remediation community.

DETAILED DESCRIPTION OF THE PREFERRED EMBODIMENTS

As discussed in the previous section, the present invention comprises a zero-valent metal emulsion containing zero-valent metal particles, surfactant, oil and water, and a method of using the same, to enhance the dehalogentation of dense non-aqueous phase liquid (DNAPL) sources. Although the present invention is particularly suitable for the dechlorination of trichoroethene (TCE), other DNAPL sources may likewise be remediated using the subject zero-valent metal emulsion.

The zero-valent metal emulsion contains a surfactant stabilized biodegradable oil-in-water emulsion with zero-valent metal particles contained within emulsion micelles. In one preferred embodiment, a zero-valent iron emulsion containing zero-valent nanoscale iron particles or microscale iron particles is used to dehalogenated DNAPLs. However, other zero-valent metal particles and combinations may be used, including various bimetallic particle combinations and, more specifically, iron particles doped with palladium. In the preferred zero-valent iron emulsion, a very active zero-valent iron emulsion contains 32–53 wt. % oil, 36–59 wt % water, 6.4–10.6 wt. % iron particles, 1.0–1.8 wt. % surfactant. More preferably, the zero-valent iron emulsion contains 42.7 wt. % oil, 47.4 wt. % water, 8.5 wt % iron particles, 1.4 wt. % surfactant. However, other ranges of oil, water, iron particles, and surfactant may also be effective to dehalogenate DNAPLs as shown in the Examples below.

Zero-valent metal particles have been proven to effectively degrade halogenated solvents. For example, the mechanism and reaction rates of which iron reduces chlorinated aliphatics has been studied extensively due to iron's low cost and low toxicity. The half reaction of ($Fe^0$) to ($Fe+^2$) as seen in Equation 1 has a reduction potential of −0.440V. The estimated standard reduction potentials of alkyl halides at a pH of 7, as in Equation 2, ranges from +0.5 to +1.5V. Therefore, the net reaction (Equation 3) is thermodynamically favorable.

$$Fe^0 \rightarrow Fe^{2+} + 2e^- \tag{1}$$

$$RX + 2e^- + H^+ \rightarrow RH + X^- \tag{2}$$

$$Fe^0 + RX + H^+ \rightarrow Fe^{2+} + RH + X^- \tag{3}$$

These equations indicate that the iron assisted reductive dehalogenation of the chlorinated solvents is a corrosive process.

Additionally, the pathways of the dehalogenation of DNAPL's such as TCE have been proposed. TCE undergoes hydrogenolysis where the replacement of each of the three chlorines occurs sequentially. TCE reduces to cis-1,2-dichloroethene, trans-1,2-dichloroethene, and 1,1-dichloroethene. These intermediates in turn reduce to vinyl chloride, ethene and ethane.

In use, DNAPL sources diffuse through the oil membrane of the zero-valent metal emulsion whereupon they reach the surface of the zero-valent metal particles where dehalogenation takes place. A hydrocarbon reaction by-product of the dehalogenation reaction, for example ethene, diffuses out of the emulsion micelle and vents to the aquifer.

The zero-valent metal emulsion may be delivered to the DNAPL phase in a variety of ways. Ideally, the DNAPL phase would be located and defined. In one embodiment, the zero-valent metal emulsion is delivered in-situ to contamination pools via a system of injection wells. The injection wells are permanent structures that are left in the ground for repeatedly injecting the zero-valent metal emulsion into the ground. The injection wells may contain screen portions through which the zero-valent metal emulsion may pass in order to contact the DNAPL phase. Alternatively, the zero-valent metal emulsion may be delivered to the DNAPL using direct push technology. This technology includes push rods that are forced into the injection site. A distal portion of the push rods has a series of holes along its length for delivering the zero-valent emulsion. The push rods are advanced further into the soil depending on the amount and depth of the contamination. When the injection of the zero-valent metal emulsion is complete, the push rods are removed from the ground. It is also possible to deliver the zero-valent metal emulsion by way of slurry injection into a soil matrix. This process decreases the need for long-term treatment and monitoring of the contaminated areas.

EXAMPLES

To test the effectiveness of the present invention, a number of zero-valent iron emulsions were prepared to demonstrate their ability to degrade halogenated solvents, such as TCE. It was shown that zero-valent iron emulsions are far superior in their ability to degrade a free-phase of a halogenated solvent, specifically TCE, as compared to the use of pure zero-valent iron particles, which are rejected by the TCE phase. The zero-valent metal emulsion possesses the ability to pull DNAPL-phase TCE into its micelle structure where degradation of TCE takes place. Zero-valent iron emulsions degrade the pure TCE phase at a rate comparable to the degradation of dissolved phase TCE by iron particles, while pure iron particles have a very low degradation rate on free-phase TCE. No chlorinated by-products from the degradation of TCE pass out of the micelle wall. The only degradation products that have been observed to exit from the zero-valent metal emulsion are ethene and other trace amounts of hydrocarbons. Thus, from a chemistry point of view, the zero-valent metal emulsion is a very viable methodology for remediating pools of DNAPL in groundwater.

The zero-valent iron emulsions contain a plurality of iron particles (either microscale or nanoscale iron particles), surfactant, water and oil. The zero-valent iron emulsion is preferably made in an inert atmosphere with a minimum amount of oxygen present in order to prevent the zero-valent iron emulsion from being oxidized. Since increased surface area of the zero-valent iron particles relates to the rate of DNAPL degradation, two different sizes of zero-valent iron particles are preferred. First, zero-valent iron particles (referred to herein as nanoscale iron particle) were synthesized in the laboratory. These nanoscale iron particles have a mean particle diameter in the range of 100–300 nm. Second, zero-valent iron particles (referred to herein as microscale iron particle) were purchased commercially and have a particle diameter range of 1–3 microns. The microscale iron particles were tested to determine if they could be emulsified as easily as the nanoscale iron particles. Also, the microscale iron particles were tested to determine if they had an activity that would make them viable candidates as substitutes for the nanoscale iron particles. An example of the microscale iron particles which may be used are commercially available Alfa Aesar 1–3 micron iron powder, 98%. Conversely, the nanoscale iron particles were synthesized in the laboratory.

To make the microscale iron particles, approximately twice the amount of required microscale iron powder (1–3 μm particle diameter) was added to a vacuum filter apparatus using Whatman 41 filter paper on a Buchner funnel. Sequentially and rapidly, under a flow of nitrogen, 25 ml of a 1% $H_2SO_4$ solution, 25 ml deionized water, and 25 ml of a 1:50 corn oil:hexane mixture were added. All of the solutions previously mentioned were purged with nitrogen for at least fifteen minutes. The microscale iron particles are then dried, scraped off, and stored under nitrogen until the iron-emulsion system is generated. The purpose of the addition of the dilute solution of corn oil is to produce a thin protective film of oil on the microscale iron particles to prevent any oxidation until the zero-valent iron emulsion is generated.

Nanoscale iron particles were prepared by adding a 1.6 M $NaBH^4$ aqueous solution dropwise to a 1.0 M $Fe_2(SO_4)_3 \cdot 6H_2O$ aqueous solution at ambient temperature with magnetic stirring. Ferric iron ($Fe^{3+}$) is reduced according to the following equation:

$$Fe(H_2O)_6^{3+} + 3BH_4^- + 3H_2O \rightarrow Fe^0 + 3B(OH)_3 + 10.5H_2 \qquad (4)$$

The precipitated nanoscale iron particles are collected by filtration under a nitrogen atmosphere, washed with deionized water and dried in a stream of flowing nitrogen. The samples are stored under nitrogen in an inert atmosphere glove box until they are ready to be used.

A large variety of anionic, cationic, and nonionic surfactants may be used to make the zero-valent metal emulsion, examples of which are listed in Table 1. The surfactant that produces the most stabilized zero-valent metal emulsion is Rhodacal N (CAS 9084-06-04). However, the preferred surfactant is a food-grade surfactant because of its low toxicity and environmental impact.

TABLE 1

Surfactants for the zero-valent metal emulsion.

| Trade Name | Chemical Name | CAS # |
|---|---|---|
| Aerosol OT (10% and 75%) Foodgrade | Sodium sulfoccinate | 577-11-7 |
| Arlacel 83 | Sorbitan sesquioleate | 8007-43-0 |
| Alkamuls PSMO-20 Foodgrade | Sorbitan monooleate (Ethoxylated) | 9005-65-6 |
| Lonzest STO | Sorbitan Trioleate | 26266-58-0 |

TABLE 1-continued

Surfactants for the zero-valent metal emulsion.

| Trade Name | Chemical Name | CAS # |
|---|---|---|
| Rhodacal DS-4 | Sodium Dodecylbenzene Sulfonate | 25155-30-0 |
| Rhodacal N | Sodium Napthalene Sulfonate (Formaldehyde Polymer) | 9084-06-4 |
| Rhodapon LSB Foodgrade | Sodium Lauryl Salfate | 151-21-3 |
| Span 60 Foodgrade | Sorbitan Monostearate | 1338-41-6 |
| Span 80 Foodgrade | Sorbitan Monooleate | 1338-43-8 |
| Span 85 Foodgrade | Sorbitan Trioleate | 26226-58-0 |
| Tween 61 | Polyoxyethylene-sorbitan Monostrearate | 9005-67-8 |
| Tween 65 | Polyoxyethylene-sorbitan Tristeanate | 9005-71-4 |
| Tween 80 | Polyoxyethylene-sorbitan Monooleate | 9005-65-6 |
| Tween 81 | Polyoxyethylene-sorbitan Monooleate | 9005-65-6 |
| Tween 85 | Polyoxyethylene-sorbitan Trioleate | 9005-70-3 |

After the microscale and nanoscale iron particles are generated, the appropriate amount of microscale or nanoscale iron particles, surfactant, and oil are added to a Teflon beaker. Under a stream of nitrogen, the beaker is placed under an emulsifier at approximately half depth, and turned on to low speed. Deionized water is then added. The power of the emulsifier was slowly raised until a power of 3 out of 10 and the solution was emulsified for 6.0 minutes. The iron-emulsion system is then removed and stored under nitrogen. Table 2 lists the ratios of nanoscale iron particles, food-grade surfactant, oil and water that produced the most stable iron-emulsion systems.

TABLE 2

Amounts of components used in making the most stable food-grade iron emulsion systems.

| Emulsion ID | Nanoscale Iron (g) | Surfactant (g) | Water (ml) | Oil (ml) |
|---|---|---|---|---|
| Rhodapon LSB #4 | 6.0 | 0.50 | 10 | 30 |
| Rhodapon LSB #4 | 6.0 | 1.0 | 30 | 30 |
| Span 80 #4 | 6.0 | 0.50 | 10 | 30 |
| Alkamuls PMSO-20 #5 | 6.0 | 1.0 | 30 | 30 |
| Span 85 #5 | 6.0 | 0.50 | 10 | 30 |
| Span 85 #5 | 6.0 | 1.0 | 30 | 30 |

EXPERIMENTAL STUDIES

The following Table 3 indicates a plurality of iron-emulsion systems that were produced containing microscale iron particles. These zero-valent iron emulsions (also referred to as iron emulsions) were studied to determine their effectiveness in remediating TCE. Solution Bag studies, Pool Bag studies, Jar studies and Headspace Pool studies were conducted and the results were analyzed.

TABLE 3

Combinations of microscale iron, surfactant (rhodacal N) and corn oil used in making initial iron emulsion

| Emulsion ID | Iron (g) | Surfactant (g) | Water (ml) | Oil (ml) |
|---|---|---|---|---|
| E124a | 2 | 5 | 20 | 20 |
| E126a | 5 | 4 | 20 | 20 |
| E127a | 8 | 4 | 20 | 20 |
| E128a | 10 | 4 | 20 | 20 |
| E129a | 10 | 4 | 20 | 10 |
| B130a | 15 | 5 | 20 | 10 |
| E136a | 5 | 4 | 20 | 5 |
| E137a | 10 | 4 | 20 | 5 |
| E138a | 15 | 5 | 20 | 5 |
| E139a | 5 | 5 | 20 | 5 |
| E140a | 10 | 4 | 20 | 5 |
| E141a | 15 | 5 | 20 | 5 |
| E142a | 5 | 4 | 20 | 5 |
| E143a | 10 | 4 | 20 | 5 |
| E144a | 15 | 5 | 20 | 5 |
| E156a | 10 | 3.5 | 20 | 5 |
| E157a | 8 | 3.5 | 20 | 5 |
| E154a | 12 | 4.5 | 20 | 5 |
| E155a | 8 | 4.5 | 20 | 5 |
| E153a | 8 | 4 | 20 | 5 |
| E160a | 5 | 4 | 20 | 20 |
| E161a | 5 | 4 | 20 | 15 |
| E162a | 5 | 4 | 20 | 10 |
| E150a | 5 | 4 | 20 | 2 |
| E151a | 10 | 4 | 20 | 2 |
| E152a | 15 | 4 | 20 | 2 |
| E165a | 10 | 8 | 20 | 40 |
| E166a | 5 | 4.5 | 20 | 20 |
| E167a | 5 | 3.5 | 20 | 20 |
| E168a | 6 | 4.0 | 20 | 20 |
| E169a | 6 | 4.5 | 20 | 20 |
| E163a | 5 | 7. | 20 | 20 |
| E164a | 5 | 7 | 20 | 20 |
| E200a | 10 | 2 | 10 | 5 |
| E201a | 5 | 1 | 5 | 5 |
| E202a | 10 | 2 | 10 | 2 |
| E203a | 10 | 1 | 10 | 5 |
| E204a | 10 | 0 | 10 | 4 |
| E205a | 10 | 2 | 10 | 1 |
| E206a | 10 | 1 | 10 | 0 |
| E207a | 10 | 1 | 10 | 1 |
| E208a | 10 | 0 | 10 | 0 |
| E209a | 10 | 0 | 10 | 1 |
| E210a | 10 | 1 | 10 | 2 |
| E211a | 10 | 2 | 10 | 1 |
| E212a | 10 | 3 | 10 | 1 |
| E213a | 10 | 1 | 10 | 0 |
| E214a | 10 | .5 | 10 | 1 |
| E215a | 10 | .25 | 10 | 1 |

Once the iron emulsions were generated, they were observed for physical characteristics such as density relative to water and spherical emulsion micelles. This was achieved by adding approximately 2 grams of iron emulsion to approximately 35 ml of water to a 40 ml vial, shaking the mixture, and letting the mixture settle. Additionally, aliquots of iron emulsions that proved to be most reactive were photographed using a high magnification microscope.

An additional visual experiment was designed to determine if the iron emulsion was actually challenging the DNAPL pool. In an inert atmospheric environment, 10 ml of pure TCE dyed with sudan red and 15 ml of deoxygenated water were added to three 40 ml vials. To one of these vials, 1.0 g of pure nanoscale iron particles were added. To another 1.0 grams of iron emulsion Span85 #5 was added. The systems were observed and compared.

Solution Bag Studies

Since it was necessary to take multiple analyses over a period of days to test the iron emulsion's ability to reduce TCE, the following experiments were set-up in Tedlar bags.

These bags allow for the periodic removal of representative samples without generating headspace. Bag studies were set-up in an inert atmosphere box to prevent competing oxidation of iron particles with atmospheric oxygen. Additionally, groundwater has a low level of dissolved oxygen, and running the experiments anaerobically seemed to best mimic real conditions.

Each 1.0 L Tedlar bag was disassembled and placed into a controlled inert atmosphere work area. To each bag, an appropriate amount of iron-emulsion was added by weight (See Table 4).

TABLE 4

Amounts of components used in the solution bag studies.

| Bag Id | Emul. or Iron (g) | TCE Soln. (ml) | Iron (g) per 300 ml Soln |
|---|---|---|---|
| Control (TCE solution only) | 0 | 300 | 2.0 |
| Iron Only (w/TCE solution) | 2.0 | 300 | 2.0 |
| Iron Only (w/TCE solution) | 2.0 | 300 | 2.0 |
| E124a | 11.0 | 300 | 2.0 |
| E124a D | 11.0 | 300 | 2.0 |
| E126a (bottom) | 10.6 | 300 | 2.0 |
| E126a (bottom) D | 10.6 | 300 | 2.0 |
| E136a (bottom) | 14.0 | 300 | 2.0 |
| E136a (bottom) D | 14.0 | 300 | 2.0 |

In an effort to make direct comparison of each iron-emulsions' rate constant to the rate constant of pure iron particles, an appropriate amount of iron-emulsion was added to each bag so that it contained 2.0 g of iron particles. The bags were reassembled. A solution of approximately 5 mg/L TCE was made by taking 8.0 ml of a saturated TCE: water solution, and adding it to 4000 ml of nitrogen purged deionized water. Three hundred grams of this diluted solution was pumped into each Tedlar bag. The bag was then burped to remove any headspace present. The approximately 5.0 ppm solution was then analyzed by gas chromatography to get an accurate initial TCE concentration. Within each batch of bag studies, each iron-emulsion to be analyzed was setup in duplicate. A control bag was also setup to monitor TCE loss and to determine if any impurities had been introduced. Each of these bags was monitored on a regular basis for TCE and its chlorinated by-products 1,1-dichlorethene, cis-1,2-dichloroethene, trans-1,2-dichlorothene, and vinyl chloride. The two carbon ($C_2$) containing nonhalogenated by-products (ethane, acetylene, and ethane) could not be resolved chromatographically using various columns that have been proven to separate the chlorinated by-products. Therefore, these $C_2$ compounds were quantified using the response factor or calibration curve of ethene. Although this is not an accurate measure of the production of each of these gases, it serves the purposes of being able to relatively quantify the by-products.

TCE Pool Bag Studies

The TCE pool bag studies were setup similarly to the TCE solution bag studies except that 100 $\mu$l of pure TCE was added to the bags after 300 ml of nitrogen purged deionized water was pumped in. These bags were also monitored for TCE and breakdown products by gas chromatography on a regular basis.

Jar Studies

The purpose of the jar studies was to visualize the reduction of the TCE pool as well as to observe the possible migration of the TCE into the iron-emulsion. Sudan Red 5, a dye that only enters non-aqueous liquids, was added to commercial grade TCE. The test containers were 250-ml jars filled with domestic sand. To these jars, 9.0 ml of dyed TCE was injected and approximately 5 ml of various iron-emulsions were injected. Table 5 lists the different iron-emulsion systems that were setup for jar studies. Nitrogen purged deionized water was added to generate zero headspace. A septum-lined lid with two resealable ports was placed on the jar.

The jars were photographed periodically to visually monitor the TCE degradation. Aliquots that were analyzed by drawing 500 ml portions of the jar sample while simultaneously adding 500 $\mu$l of nitrogen purged deionized water. These samples were then monitored periodically for TCE and break down products. These samples foamed in the purge and trap auto sampler causing instrumentation problems.

TABLE 5

Amounts of each iron-emulsion in Jar Study

| Emulsion | Weight Emulsion (g) |
|---|---|
| E124 | 11.11 |
| E124a Top | 9.16 |
| E124a Bot | 9.44 |
| E126a Top | 8.85 |
| E136a Bot | 11.43 |
| E201a | 10.85 |
| E204a | 12.84 |
| E205a | 13.30 |
| E207a | 11.82 |
| E208a | 14.01 |
| E209a | 11.19 |
| E213a | 12.35 |
| E214a | 9.14 |

Headspace Pool Study

A headspace TCE pool study was designed in an effort to get analytical data to support the conclusion that the iron-emulsion would actually challenge the DNAPL pool and thus remediate more efficiently than a pure-iron particle containing slurry. For each sample, 100 $\mu$l of pure TCE and 1.0 g of nanoscale iron-emulsion or iron (as listed in Table 2) were added to a volume of 25 ml of deoxygenated water in 30 ml crimp top vials in an inert atmospheric environment. The vial tops were sealed producing 5 ml of inert headspace at atmospheric pressure. Prior to analysis, the vials were brought to 30° C. and equilibrated for at least 5.0 minutes. 500 $\mu$l aliquots of headspace were analyzed by GC/FID periodically and monitored for $C_2$ gas formation.

Reactivity of the Iron-emulsion

Unreactivity Concerns

Since the dehalogenation reaction of TCE occurs at the surface of the iron particle, one of the greatest concerns is whether incorporating the iron particle into an iron-emulsion would make it unreactive. To address this concern, TCE degradation was monitored when specific amounts of iron-emulsion were added to TCE solutions. The rate of degradation was compared to controls that contained only TCE solution and to controls that contained pure iron and TCE solution. Initial studies did show $C_2$ generation from the samples that contained iron-emulsion and samples that contained pure iron particles. The numerous detector responses, in addition to the ethene peaks, are representative of other non-chlorinated by-products.

This production of ethene shows that this iron-emulsion may indeed be used as a viable DNAPL remediation tool. To further demonstrate the iron-emulsion's ability to effectively remediate DNAPL pools, kinetic studies were employed. These studies also compared varying reactivities from different combinations of amounts of each of the iron, oil, water, and surfactant. Of the combinations tested, as seen in Table 3, mixtures E124a, E126a and E136a possessed the desired characteristics of a potential iron-emulsion candidate. Specifically, each iron-emulsion contained spherical structures that were denser than water, and maintained structural stability when immersed in water.

TCE Sorption Observed

Upon inspection of the data retrieved from these kinetics studies, it was noticed that the TCE concentration of the iron-emulsion samples contained considerably less TCE than the control sample, which did not contain an iron-emulsion or iron particles. This leads to the conclusion that the iron-emulsion was not only reducing the TCE into by-products, but it was also absorbing the TCE. This conclusion was supported by the presence of low surrogate recoveries on samples that contained iron-emulsions. These low surrogate recoveries were directly related to the low TCE recovery (Table 6).

TABLE 6

TCE and surrogate recoveries for solution bag studies from analysis 2 days after experimental setup.

| Sample | TCE Concentration ($\mu$mol/l) | Surrogate Recovery |
| --- | --- | --- |
| Control (TCE only) | 50 | 92% |
| Control W/ Pure Iron | 46 | 110% |
| Emulsion 124a | 11 | 22% |
| Emulsion 126a | 32 | 69% |
| Emulsion 136a | 14 | 32% |

To further evaluate this sorption, iron-emulsions were made that were not fortified with iron particles. These iron-emulsions were setup as bag studies and analyzed by GC/FID along with the bag samples that were setup to determine the rates of reactivities of the various iron-emulsions. The data in Table 7 also supports the hypothesis that the iron-emulsions were significantly absorbing the TCE from the solution.

TABLE 7

Sorption determined by emulsions without iron.

| Sample | Weight (g) | AVG % Recovery | % Sorption |
| --- | --- | --- | --- |
| E124b (no Iron) | 12.0 | 42 | 58 |
| E126b (no Iron) | 16.6 | 60 | 40 |
| E136b (no Iron) | 11.2 | 59 | 41 |

Sorption of DNAPLs could be an added advantage to the iron-emulsion remediation, in that it could help immobilize or contain the DNAPL pools while remediation is occurring. Other proposed remediation technologies, such as surfactant rinsing, have been challenged by DNAPL mobilization that can increase the area of the contaminated sites.

CONCLUSION

Many different iron-emulsions were generated that had the initial properties that were required to effectively treat DNAPL pools. Specific ratios of oil, water, iron particles and surfactant were tested for their relative reactivities in the reductive dehalogenation of DNAPL pool. It was found that the reactivity of the iron-emulsion could be optimized by adjusting the specific ratios of components and by the choice of surfactants. The edible surfactant Span 85 with a component ratio of: 6.0 g nanoscale iron, 1.0 gram surfactant, 30 ml water, and 30 ml corn oil, produced the most reactive iron-emulsion. Its reactivity has been proven to be at least two orders of magnitude greater than iron alone. This increased reactivity was determined to be based on the increased reactive surface area generated by the iron-emulsion's ability to enter the DNAPL pool and allow reduction to occur from within the pool. Hydrophilic iron slurries were shown to be rejected by the DNAPL pool leaving the particle sitting upon the surface of the pool. In addition to the iron-emulsion's ability to enter and remediate the DNAPL pool, the addition of the iron-emulsion increases the solubility of TCE in water. This allows other remediation systems that focus on the ground water to more effectively remove the DNAPL from a contaminated site.

Although the present invention has been disclosed in terms of a number of preferred embodiments, it will be understood that numerous modifications and variations could be made thereto without departing from the scope of the invention as defined by the following claims:

What is claimed is:

1. A zero-valent metal emulsion comprising, a) 6.4–10.6 wt. % a plurality of zero-valent iron particles;

b) 1.0–1.8 wt % a surfactant;

c) 32–53 wt. % an oil; and d) 36–59 wt. % water.

2. The zero-valent metal emulsion of claim 1, comprising:

a) 8.5 wt. % zero-valent iron particles;

b) 1.4 wt. % surfactant;

c) 42.7 wt. % oil; and d) 47.4 wt. % water.

3. The zero-valent metal emulsion of claim 1, wherein said plurality of zero-valent iron particles is a plurality of nanoscale zero-valent iron particles or a plurality of microscale zero-valent iron particles.

4. The zero-valent metal emulsion of claim 3, wherein said plurality of nanoscale zero-valent iron particles are 100–300 nm in diameter.

5. The zero-valent emulsion of claim 3, wherein said plurality of microscale zero-valent iron particles are 1–3 microns in diameter.

\* \* \* \* \*